United States Patent
Reynolds

(10) Patent No.: US 12,012,040 B1
(45) Date of Patent: Jun. 18, 2024

(54) VEHICLE LOCKED WHEEL DETECTOR

(71) Applicant: Mark R. Reynolds, Graceville, MN (US)

(72) Inventor: Mark R. Reynolds, Graceville, MN (US)

(*) Notice: Subject to any disclaimer, the term of this patent is extended or adjusted under 35 U.S.C. 154(b) by 0 days.

(21) Appl. No.: 18/528,590

(22) Filed: Dec. 4, 2023

(51) Int. Cl.
| | |
|---|---|
| *B60Q 9/00* | (2006.01) |
| *B60T 8/17* | (2006.01) |
| *B60T 8/1761* | (2006.01) |
| *B60T 13/38* | (2006.01) |
| *B60T 17/22* | (2006.01) |
| *B62D 53/06* | (2006.01) |
| *G01P 3/00* | (2006.01) |

(52) U.S. Cl.
CPC .............. *B60Q 9/00* (2013.01); *B60T 8/1708* (2013.01); *B60T 8/17616* (2013.01); *B60T 13/385* (2013.01); *B60T 17/22* (2013.01); *B62D 53/06* (2013.01); *G01P 3/00* (2013.01); *B60T 2240/00* (2013.01); *B60T 2270/40* (2013.01)

(58) Field of Classification Search
CPC ..... B60Q 9/00; B60T 8/1708; B60T 8/17616; B60T 13/385; B60T 17/22; B60T 2240/00; B60T 2270/40; B62D 53/06; G01P 3/00
See application file for complete search history.

(56) References Cited

U.S. PATENT DOCUMENTS

| | | |
|---|---|---|
| 2,395,203 A | 2/1946 | Stewart |
| 2,601,140 A | 6/1952 | Hines |
| 2,778,008 A | 1/1957 | Wilson et al. |
| 2,815,503 A | 12/1957 | Amos |
| 2,959,772 A | 11/1960 | Bruner |
| 3,840,850 A | 10/1974 | Whiteing et al. |

(Continued)

FOREIGN PATENT DOCUMENTS

| | | |
|---|---|---|
| CN | 111267821 A | 6/2020 |
| WO | WO202259000 A1 | 12/2022 |

OTHER PUBLICATIONS

Mucevski, Kiril, "Inductive and Hall Effect RPM Sensors Explained" May 26, 2015, 4 pgs, downloaded from https://www.linkedin.com/pulse/inductive-hall-effect-rpm-sensors-explained-kiril-mucevski.

(Continued)

*Primary Examiner* — Kevin Hurley
*Assistant Examiner* — Marlon A Arce
(74) *Attorney, Agent, or Firm* — Albert W. Watkins

(57) ABSTRACT

A vehicle locked wheel detector detects initial trailer movement or enablement thereof, for example using a spring brake air pressure switch. The outputs from ABS wheel rotation sensors are monitored to determine whether all wheels are rotating. If one wheel is not rotating, then a locked wheel indicator alerts the driver that one of the wheels may be locked. In some embodiments, if both wheels on one side of the trailer are either stationary or rotating below a threshold speed and the wheels on the opposite side are rotating relatively more quickly, then the trailer is presumed to be pivoting around a sharp turn, and so the wheels will be presumed to be rolling. A finite temporal-spatial interval subsequent to initial trailer movement is defined within which wheel lock can be detected, and upon expiration of the temporal-spatial interval the ABS operates in a normal manner.

13 Claims, 4 Drawing Sheets

(56) References Cited

U.S. PATENT DOCUMENTS

| | | | |
|---|---|---|---|
| 3,930,224 A | 12/1975 | Whiteing et al. | |
| 4,031,509 A | 6/1977 | Matulevich | |
| 4,119,284 A | 10/1978 | Belmont | |
| 4,161,717 A | 7/1979 | Hoover et al. | |
| 4,281,881 A * | 8/1981 | Mekosh, Jr. | B60T 8/74 |
| | | | 303/DIG. 8 |
| 4,777,611 A | 10/1988 | Tashiro et al. | |
| 4,947,325 A | 8/1990 | Iwata et al. | |
| 5,130,933 A | 7/1992 | Kitano | |
| 5,290,095 A | 3/1994 | Wood et al. | |
| 5,900,803 A | 5/1999 | Politz et al. | |
| 5,922,949 A | 7/1999 | Nakajima | |
| 6,232,875 B1 | 5/2001 | Dezorzi | |
| 6,246,316 B1 | 6/2001 | Andsager | |
| 6,728,606 B2 | 4/2004 | Kumar | |
| 6,813,583 B2 | 11/2004 | Kumar et al. | |
| 6,834,221 B2 | 12/2004 | Jager et al. | |
| 6,943,675 B2 | 9/2005 | Petersen et al. | |
| 7,024,291 B2 | 4/2006 | Sudou | |
| 7,705,743 B2 | 4/2010 | Barone et al. | |
| 7,917,257 B2 | 3/2011 | Kumar | |
| 8,171,791 B2 | 5/2012 | Sy et al. | |
| 8,326,480 B2 | 12/2012 | Kobe et al. | |
| 2008/0269994 A1 * | 10/2008 | Karlsson | B60W 30/18118 |
| | | | 192/13 R |
| 2015/0027823 A1 * | 1/2015 | Murata | B60T 7/12 |
| | | | 188/162 |
| 2016/0229433 A1 | 8/2016 | Traylor et al. | |
| 2017/0151935 A1 * | 6/2017 | Prohaszka | B60T 7/20 |
| 2021/0078550 A1 * | 3/2021 | Han | B60T 8/1708 |
| 2023/0041676 A1 * | 2/2023 | Cha | B60T 8/17616 |
| 2023/0347999 A1 * | 11/2023 | Desmarais | B62D 55/10 |

OTHER PUBLICATIONS

Hella Tech World—The Workshop's Friend, "Check and change ABS and wheel speed sensors", 4 pgs, downloaded on May 19, 2023 from https://www.hella.com/techworld/us/Technical/Sensors-and-actuators/Check-change-ABS-sensor-4074/.

Tiepie Automotive, "Measuring an inductive ABS sensor", 1 page, downloaded on May 18, 2023 from https://www.tiepie-automotive.com/en/articles/abs-sensor-inductive.

\* cited by examiner

FIG. 3
(PRIOR ART)
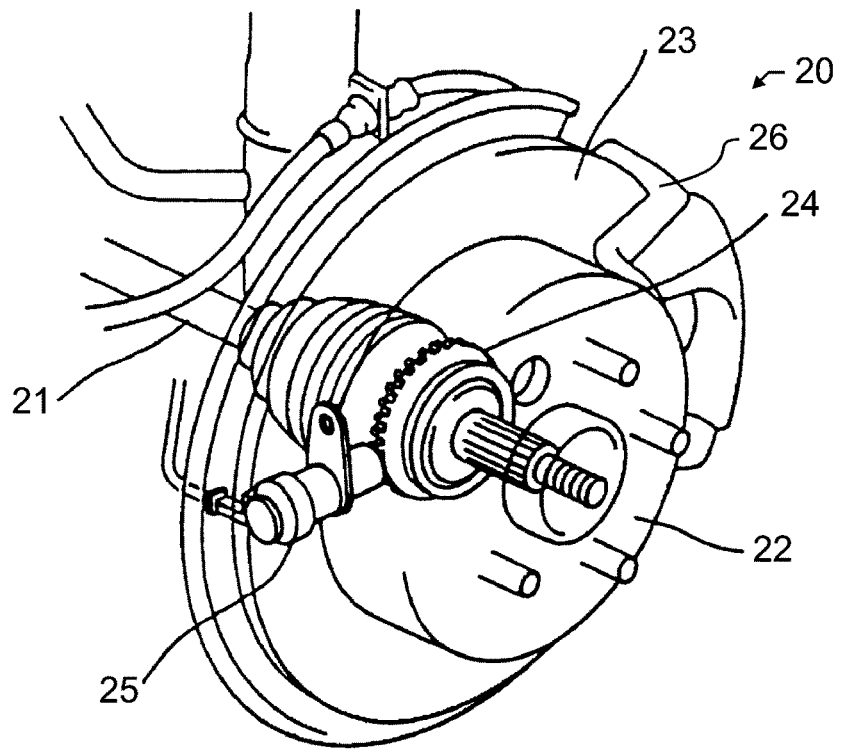
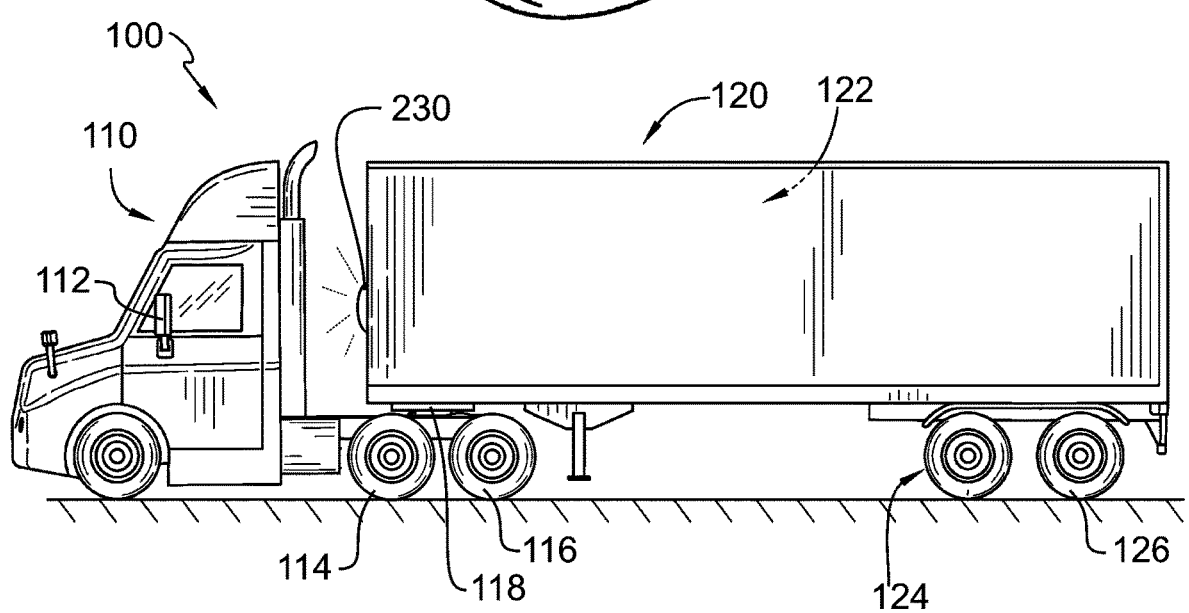
FIG. 4

VEHICLE LOCKED WHEEL DETECTOR

BACKGROUND OF THE INVENTION

1. Field of the Invention

The present invention pertains generally to electrical communications, and more particularly to: land vehicle alarms or indicators responsive to speed differences detected within a vehicle power train that indicate a locked wheel; and condition responsive indicating systems responsive to differences in wheel angular velocity that indicate a locked wheel. In one preferred manifestation, the present invention monitors anti-lock brake wheel rotational speed sensors on each truck trailer wheel hub to identify a wheel hub that is locked and not rolling just subsequent to release of spring brakes and initial movement of the tractor.

2. Description of the Related Art

Transportation of goods from one location to another is vital in modern society. This transport may, for example, be the delivery of source materials and parts to a manufacturing facility many miles away, and subsequently the delivery of finished products from the manufacturing facility to distribution centers again hundreds or thousands of miles away. In other cases, the goods or cargo may be transported for local delivery, for example from a distribution center to local businesses or customer.

There are about 3 million semi-trucks, also known as semi-tractors, registered in the United States. These tractors are used to pull semi-trailers from one location to another. About two-thirds of all goods in the United States are transported by these tractor-trailer combinations.

The tractors are readily connected and disconnected from the trailers, which permits a truck driver to drop a trailer at a location where the trailer will be unloaded and/or loaded to prepare the trailer for the next trip. The trailer acts as a container, protecting the contents and thereby allowing the trailer to sit for any length of time required or desired for the loading and unloading. After dropping off one trailer, the truck driver may pick up another trailer that has already been prepared for transit. As may be appreciated, the length of time that a trailer is left sitting is unpredictable. Likewise, the weather that the trailer is exposed to both just prior to sitting and when readied for the next transport is also unpredictable. A similar situation can arise when a driver stops even for a few hours or overnight at a hotel, motel, or rest area.

When the trailer is moving and then subsequently parked, the wheel set is exposed to the elements. While these wheel sets have been designed explicitly for exposure to the weather, there are certain combinations that can lead to an undesirable locking of one or more of the wheels. One particularly undesirable combination is when a truck is traveling and the temperatures are near freezing. When either the temperature is just above freezing and the wheels get wet, or even if the temperature is below freezing and the wheel bearing friction and trailer brakes heat the wheelset to a temperature above freezing, moisture can collect on the brakes and rotors. With continued driving, the moisture will evaporate, drying the wheel set. However, if the moisture collects just before parking the trailer, such as when the trailer wheels are driven through a loose snow drift or the like, this moisture can remain accumulated on the brakes and rotors. If the temperature is or soon after parking drops below freezing, the accumulated moisture will freeze. Particularly when the temperature continues to drop, this newly formed ice can be extremely hard to break apart.

Most semi-trailers have spring brakes that are automatically applied, even when disconnected from the semi-tractor. When a truck driver starts the truck and wants to move the tractor-trailer combination, pressure from the truck's engine-powered air pump releases the spring brakes. However, accumulated moisture that has frozen in place can prevent the wheel components from moving as intended, resulting in one or more wheels not rolling, described herein as being locked. Other causes of locked wheels besides icing can include, but are not limited to: a brake not releasing, and corrosion. If a truck driver moves a trailer that has a locked wheel, particularly a fully loaded trailer, a wheel on the semi-trailer may be locked and unable to rotate. The locked wheel will be destroyed in as little as ten feet of travel.

When a truck starts up and the tractor starts moving the trailer, there is no mechanism in place other than an observer to determine if any of the eight wheels on the trailer are locked. Noteworthy here is the fact that the locked wheel(s) will not be evident in a pre-trip inspection of the vehicle. In addition, in order for a tractor to pull a fully-loaded trailer up a steep incline, such as is common in the mountains, the tractor is able to generate an incredible amount of horsepower and torque. Unfortunately, the drag of a single locked wheel on a semi-trailer will not be easily detected by the truck driver. Instead, the wheels must be observed as the trailer begins to move, so that some of the wheels can be observed to be rotating, while one or more of the others are not. Yet, as can be appreciated, this observation must be made from both sides of the semi-trailer which would require two people on the ground and adjacent to the moving trailer, or one person moving around the moving trailer to observe both sides. A person on the ground adjacent heavily loaded moving vehicles is extremely unsafe and undesirable. Unfortunately, a locked wheel will result in a destroyed tire. The tire not only necessitates an expensive and time-consuming repair delay for the driver, it also creates road hazards both in needing to stop the tractor-trailer on the edge of the road or potentially blocking a loading dock or parking lot, and the concern that the destroyed remains of the tire itself can impinge on surrounding persons, vehicles, and the road.

One prior approach to detecting a locked wheel is illustrated in prior art FIGS. 1 and 2. As visible in FIG. 1, which shows the underside of a common 18-wheel tractor-trailer combination 10, the semi-trailer 12 has four pairs of wheels near the rear of the trailer distal to tractor 11. These are identified as right side wheels 13, and left side wheels 14, with the right and left designating which side of a forward-facing truck driver they will be on. A truck driver will first complete a pre-trip vehicle inspection while the tractor-trailer combination 10 is parked, typically checking things like the windshield, fuel tank status and tank closures, tire integrity and inflation, load integrity, and door, load cover, or load strap status, and other exteriorly visible components.

The driver will then board the cab, release the spring brakes, and drive forward as illustrated in FIG. 2, swinging tractor 11 angularly relative to trailer 12 as though turning a corner. When there is enough angular difference between tractor 11' and trailer 12' as illustrated, the driver can then see right side trailer wheels 13 in the right side view mirror. As the tractor-trailer combination 10 continues to move over the ground, the driver will watch to see that all of the right side trailer wheels 13 are rolling. Since on most semi-trailers the wheels are arranged as duals, meaning two wheels mounted on a single rotational hub, the driver will be observing the right outside two wheels that are visible.

Presuming right side trailer wheels 13 are rolling properly, the driver will next need to swing the tractor angularly to the left relative to the trailer, as though making a left turn. Note that the tractor-trailer combination will need to travel about twice as far as was required to observe the right side, since tractor 11 was initially in line with trailer 12 before checking the right side. At the right side check, tractor 11' is rotated clockwise relative to trailer 12', meaning the tractor trailer 10' must be moved enough to return to in line and then moved enough farther to swing tractor 11" angularly to the left relative to trailer 12". Once so positioned, the truck driver will again continue to move tractor-trailer combination 10 over the ground while observing the watching to see that all of the left side trailer wheels 14 are rolling.

While this prior art approach to checking that the tires are rolling is safer than having one or two persons on the ground adjacent the moving vehicle, there are several drawbacks. First, there must be enough room for the tractor-trailer combination 10 to first swing right and then swing left. There is simply not this kind of space in a rest area, at a busy loading dock, or along a road side. Furthermore, the truck driver's attention is focused on watching the trailer wheels rotate while the truck is moving forward. As can be appreciated, this is a recipe for disaster since the driver might not see an obstacle in front of the moving truck while looking at the trailer wheels. In addition, after dark or in bad weather it can be very hard for the driver to see trailer wheels 13, 14 clearly enough to be sure they are rotating.

Ant-lock Brake Systems (ABS) commonly utilize inductive or hall effect ABS wheel sensors to determine the rotational velocity of each wheel and apply maximum brake forces to slow the vehicle. When an ABS wheel sensor detects a sliding (non- or slowly rotating) wheel, the brake is released and reapplied after normal or expected rotation is detected again. As already noted above, dual tires on most semi-trailers are locked to the same hub, meaning the eight wheels on a typical trailer can be rotationally detected with four ABS wheel sensors. Also, wide tires referred to as "super singles," or occasionally as "double wide" or "fat tires" are substituted for a dual pair of wheels, and again would be rotationally detected with four ABS wheel sensors. However, this does not eliminate the possibility of trailers using eight separate hubs, and in such cases, eight rotational sensors would be required. Anti-lock brakes on semi-trucks have been required since 1997, which has significantly reduced the number of jackknife crashes.

A prior art wheel hub including an ABS wheel sensor is illustrated in prior art FIG. 3. As illustrated therein, wheel hub 20 is mounted on an axle 21, and includes a rotor 22 having the general geometry of a hat with a brim, the brim identified as the rotor brake surface 23 about which brake caliper 26 will contract to engage with rotor brake surface 23. Note that this wheel hub 20 is provided for exemplary and illustrative purposes only, and that different vehicles will be provided with different brakes including either drum and disk brakes, and also with different wheel hub constructions and geometries.

A ferromagnetic toothed disk or ring 24 passes adjacent to an inductive or Hall-effect sensor 25, which for exemplary and non-limiting purpose will generate a sine-wave output, the frequency which designates the rotational speed of rotor 22. When a wheel clearly has a rotational speed slower than the other wheels or decelerates faster than the vehicle could, the ABS lowers the brake pressure for that particular wheel or alternatively completely releases the brake pressure. This in turn will normally result in a wheel speed increase as the wheel stops the skid and re-engages with the pavement, thereby reducing the chance of the wheel sliding or skidding on the roadway. In many systems, the brake pressure will be pulsed as required to keep the braking at a maximum while still avoiding wheel sliding.

ABS sensors have been proposed for a variety of non-ABS purposes. Exemplary U.S. patents, the teachings which are incorporated herein by reference, include: U.S. Pat. No. 5,900,803 by Politz et al, entitled "Data communication device for a vehicle towed by a motor vehicle"; U.S. Pat. No. 5,922,949 by Nakajima, entitled "Wheel rotational velocity signal processing apparatus used for detection of reduction in tire air pressure"; and U.S. Pat. No. 8,326,480 by Kobe et al, entitled "Method and device for monitoring the state of tires".

Unfortunately, the use of ABS sensors for detecting wheel lock has not been possible heretofore, owing to logic and error detection built into prior art ABS systems. ABS systems detect wheel speed when the rotation signal exceeds a predetermined threshold magnitude and frequency. When a sensor malfunctions, this malfunction is determined when a sensor fails to generate a suitable rotation signal when other wheel speed or vehicle speed sensors exceed the threshold. Exemplary U.S. patents describing this, the teachings which are incorporated herein by reference, include: U.S. Pat. No. 4,947,325 by Iwata et al, entitled "Diagnostic system for rotational speed sensors in drive train of four wheels drive vehicle having central differential device"; U.S. Pat. No. 5,130,933 by Kitano, entitled "Rotation sensing system having sensor malfunction detection"; and U.S. Pat. No. 6,834,221 by Jager et al, entitled "Method of operating a motor vehicle". As a result, and in spite of the fact that ABS sensors have been used heretofore for other applications, these ABS sensors have not been able to be used to detect wheel lock.

Several highly skilled artisans have designed systems and apparatus to detect abnormal rotational speed in vehicle wheels. Exemplary U.S. patents, the teachings which are incorporated herein by reference, include: U.S. Pat. No. 3,840,850 by Whiteing et al, entitled "Apparatus for conveying information from a moving object to a stationary object"; U.S. Pat. No. 3,930,224 by Whiteing et al, entitled "Transmission of information"; and U.S. Pat. No. 6,246,316 by Andsager, entitled "Trailer tire pressure-monitoring system". The apparatus illustrated therein are configured to detect pneumatic tire abnormalities and provide suitable indicators to a driver including audio and light alarms. However, these apparatus and systems are implemented on vehicles other than the semi-tractor-trailer combinations of the present preferred embodiment. As noted herein above, anti-lock brakes on semi-trucks have been required since 1997. Unfortunately, the incorporation of these Whiteing et al and Andsager systems into vehicles already equipped with ABS systems presents serious challenges, since the necessary wheel sensors require mounting and hardware that conflicts with an ABS system and adds undesirable cost and complexity.

Additional U.S. and Foreign patents and published applications of varying relevance, the relevant teachings and contents which are incorporated herein by reference, include: U.S. Pat. No. 4,031,509 by Matulevich, entitled "Locked axle detector for a multi-axled traction vehicle"; U.S. Pat. No. 6,232,875 by DeZorzi, entitled "Apparatus and method for controlling a tire condition module of a vehicle tire"; U.S. Pat. No. 7,024,291 by Sudou, entitled "Maintenance scheduling apparatus and method therefor"; U.S. Pat.

No. 8,171,791 by Sy et al, entitled "Rotation sensor with onboard power generation"; and WO 2022/259000A1 by Rapp et al, entitled "Improved method and system for monitoring wheels".

Other U.S. and Foreign patents and published applications describe locked wheel detection in railcars, often referred to as "hot boxes" owing to the likelihood that such locked wheels will throw sparks that can start fires. The relevant teachings and contents of these documents are incorporated herein by reference, and include: U.S. Pat. Nos. 2,395,203; 2,601,140; 2,778,008; 2,815,503; 2,959,772; 4,031,509; 4,119,284; 4,161,717; 5,290,095; 6,728,606; 6,813,583; 6,943,675; 7,705,743; 7,917,257; US 2004/0172176; US 2016/0229433; and CN 111267821A.

In addition to the foregoing patents, Webster's New Universal Unabridged Dictionary, Second Edition copyright 1983, is incorporated herein by reference in entirety for the definitions of words and terms used herein.

As may be apparent, in spite of the enormous advancements and substantial research and development that has been conducted, there still remains a need for a locked wheel detection apparatus and system that is compatible with existing ABS wheel speed sensors and systems.

SUMMARY OF THE INVENTION

The present invention uses ABS wheel rotation sensors to identify a wheel that is likely stuck within the first few feet of starting motion. It is important to do this as quickly as possible, since on a fully loaded trailer the travel of ten to twenty feet on a locked wheel can cause enough damage to a tire to either destroy it, or to damage the tire enough that it is no longer safe to take on the road. To prevent this on startup, it is imperative that the driver be alerted to a locked wheel immediately, and be able to identify which wheel is locked.

A spring brake air pressure sensor detects the air pressure required to release spring brakes, which is an indication that the trailer is about to move. Next, the output from the ABS wheel rotation sensors are monitored to first detect any wheel motion, and subsequently compared to determine whether all wheels are rotating. If one wheel is not rotating, then a locked wheel indicator will let the driver know that one of the wheels may be locked. In some embodiments, if both wheels on one side of the trailer are either stationary or rotating below a threshold speed and the wheels on the opposite side are rotating relatively more quickly, then the trailer is presumed to be pivoting around a sharp turn, and so the wheels will not be presumed to be locked. In some embodiments, a single-shot relay is provided that defines a finite time window within which movement of the trailer can be detected. In some embodiments, a display is provided that indicates to the driver which wheel hub is locked.

The present invention detects the locked wheel early enough to avoid destruction of the tire, in many cases allowing the driver to free up the wheel quickly and easily, and with minimal delay or expense. In other cases, a mechanic may be needed to repair or replace parts of the trailer. However, none of the required repairs are any worse than the resulting failures that happen when a tire blows due to a locked wheel. Not only will the underlying problem also need to be addressed, but now the loaded trailer may also need special transport or roadside repair. In addition, a blown tire can in some cases cause further damage to a vehicle or surrounding objects or persons, particularly where tire debris ends up in the roadway.

In a first manifestation, the invention is, in combination, a semi-tractor, a semi-trailer, and a vehicle locked wheel detector. The semi-tractor comprises a motive power plant; a trailer coupler; and a source of compressed air. The semi-trailer comprises a tractor coupler configured to mate with the trailer coupler and allow the semi-trailer to articulate behind the semi-tractor while being towed thereby; an air line selectively coupled to the source of compressed air and configured to receive compressed air therefrom; a cargo container configured to carry cargo; a first tire offset to a first side of the semi-trailer; a first anti-lock brake system wheel rotation sensor configured to detect an angular rotation velocity of the first tire; a second tire offset to a second side of the semi-trailer distal to the first tire; a second anti-lock brake system wheel rotation sensor configured to detect an angular rotation velocity of the second tire; and a spring brake selectively released by the compressed air delivered by the air line. The vehicle locked wheel detector comprises a spring brake air pressure switch configured to detect a pressure within the air line sufficient to release the spring brake; a locked wheel indicator; and a microcomputer configured to detect a lack of rotation from the first tire angular rotation velocity sensor in combination with the spring brake air pressure switch detecting the pressure in the air line sufficient to release the spring brake, and configured to initiate the locked wheel indicator responsive thereto.

In a second manifestation, the invention is a vehicle locked wheel detector. A spring brake air pressure switch is configured to detect a pressure within the air line sufficient to release the spring brake. A locked wheel indicator is provided. A microcomputer is configured to compare the first tire rotation to the second tire rotation responsive to the spring brake air pressure switch detecting the pressure in the air line sufficient to release the spring brake, and configured to initiate the locked wheel indicator responsive to the comparison indicating a rotational speed deviation between the first tire rotation and the second tire rotation that exceeds a threshold.

In a third manifestation, the invention is a method for alerting a semi-tractor-trailer driver to adverse wheel rotation conditions. The method comprises the steps of: sensing movement of a semi-trailer; defining a temporal-spatial interval responsive to the sensing step; detecting a lack of rotation of at least one semi-trailer wheel using a first antilock brake system wheel speed sensor while the semi-trailer movement is being sensed; determining whether the temporal-spatial interval has elapsed responsive to the detecting step; and indicating a locked wheel to the semi-tractor-trailer driver responsive to the detecting a lack of rotation of the at least one semi-trailer wheel within the temporal-spatial interval.

OBJECTS OF THE INVENTION

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to detect a locked wheel on a vehicle early enough after initiation of movement to avoid destruction of the tire. A second object of the invention is to identify which wheel is locked. Another object of the present invention is to use ABS wheel rotation sensors found on nearly all semi-trailers to identify a locked wheel. A further object of the invention is to distinguish stalled wheels caused by sharp turns from locked wheels. Yet another object of the present invention is to conduct the locked wheel determination only on start-up, while allowing the ABS wheel rotation sensors to operate in normal ABS mode subsequent thereto.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 3 illustrates a prior art wheel hub including an ABS wheel sensor from a projected view with the tire and rim removed for purposes of illustration.

FIG. 4 illustrates a preferred embodiment semi-tractor and semi-trailer in combination with a preferred embodiment vehicle locked wheel detector designed in accord with the teachings of the present invention from a side elevational view.

DESCRIPTION OF THE PREFERRED EMBODIMENT

Figure 1:
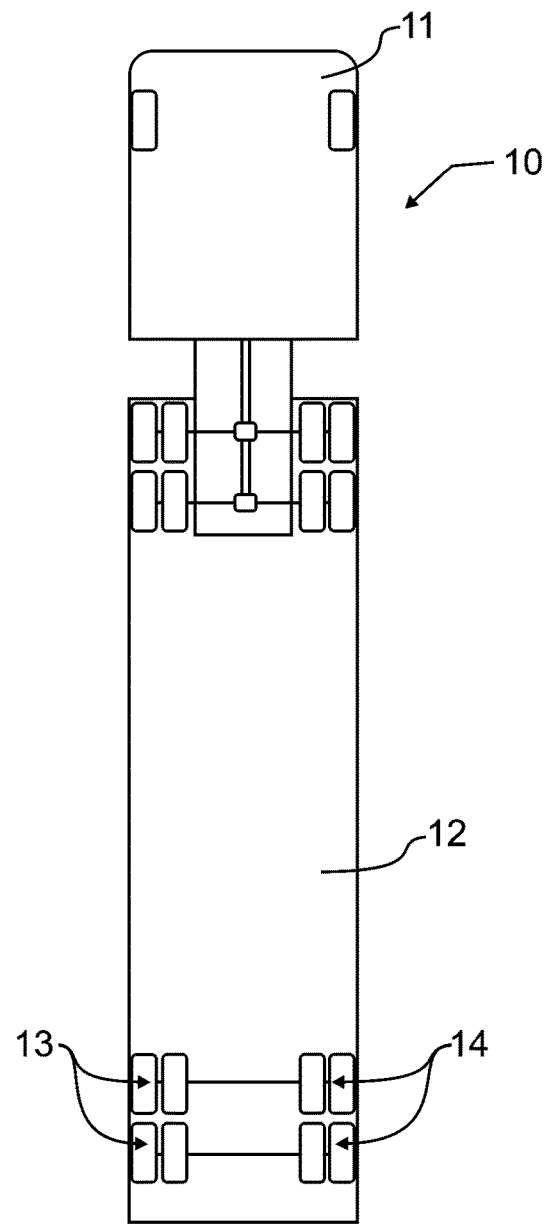
FIG. 1 illustrates the underside of a prior art 18-wheel tractor-trailer combination by simplified bottom plan view.
Figure 2:
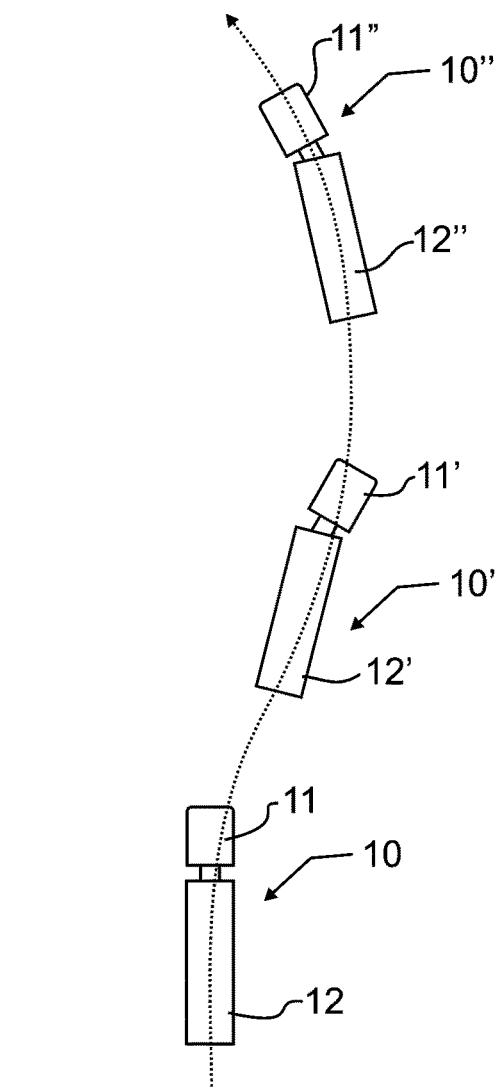
FIG. 2 illustrates a prior art method for detecting a locked vehicle wheel, depicting the prior art tractor-trailer combination of FIG. 1 in three sequential positions by simplified top plan view.

When a truck driver uses a semi-tractor to move a semi-trailer, a wheel on the semi-trailer may be locked and unable to rotate. The causes include, but are not limited to: a brake not releasing, corrosion, and icing. The present invention detects the locked wheel early enough to avoid destruction of the tire, in many cases allowing the driver to free up the wheel quickly and easily, and with minimal delay or expense.

Manifested in the preferred embodiment and illustrated in FIG. 4, the present invention provides a vehicle and locked wheel detector combination 100 that combines a prior art semi-tractor 110 and semi-trailer 120 with a preferred embodiment vehicle locked wheel detector 200. Semi-tractor 110 includes a side view mirror 112, tandem drive axles 114, 116, and kingpin coupler 118.

Semi-trailer 120 includes a cargo container 122, front tire dual 124, and rear tire dual 126. While not visible or numbered, it will be understood that semi-trailer 120 also has a second pair of front and rear tire duals on the opposed and hidden side of the trailer in a known manner and as illustrated for exemplary purpose in the prior art view of FIG. 1.

In the event one of the four wheel hubs on semi-trailer 120 is detected as locked, an indicator light 230 is preferably mounted on semi-trailer 120 in a location that will be visible to a truck driver sitting in the driver's seat in semi-tractor 110. In a preferred embodiment, indicator light 230 will be a white light, preferably activated to either flash or provide a rotating directed beam in the manner of a light house or flashing lights of an emergency vehicle such as a patrol car, fire engine, or ambulance. While other colors, beams, and continuous or discontinuous illumination will be provided in alternative embodiments, the present inventor recognizes that red lights are not permitted in many jurisdictions since these can be confused with brake lights, amber lights are often used to designate ABS failures, leaving a white light as a preferred choice. Flashing or rotating directed beam illumination tends to be more effective at garnering attention. Additionally, while a light is illustrated in FIG. 4 as a preferred locked wheel indicator 230, in alternative embodiments other indicators will be provided as well. For exemplary and non-limiting purpose, such alternative indicators include sound generators and within-the-cab indicia such as an indicator panel or screen that provides specific indication as to which of the four trailer wheel hubs are locked.

As known in the prior art illustrated in FIG. 3, a ferromagnetic toothed disk or ring 24 turns with a wheel hub, tire, or the like. The teeth pass adjacent to an inductive or Hall-effect ABS wheel rotation sensor 25, which for exemplary and non-limiting purpose will generate a sine-wave output, the frequency which designates the rotational speed of rotor 22.

Figure 5:
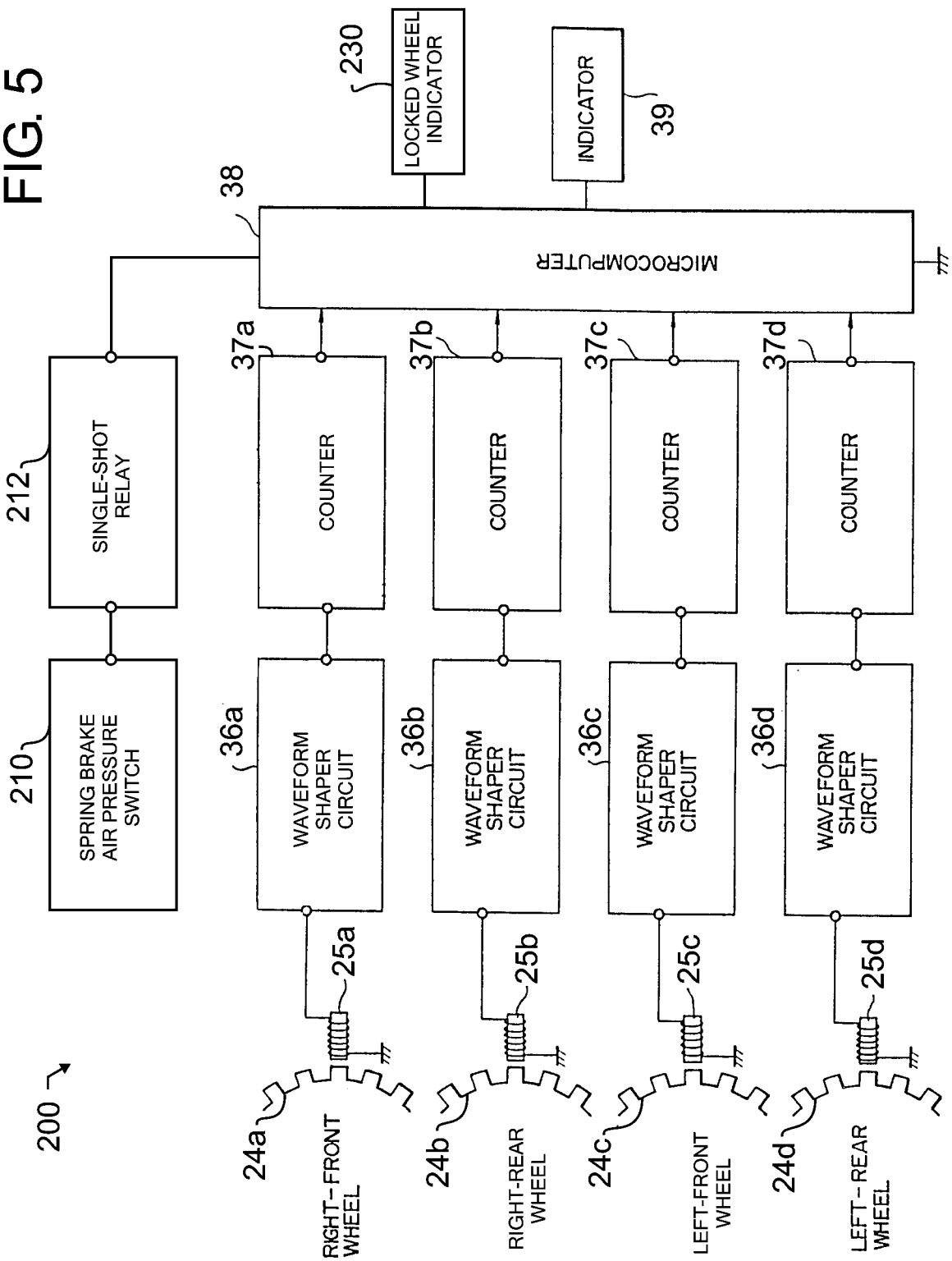
FIG. 5 illustrates the preferred embodiment vehicle locked wheel detector by schematic block diagram.

FIG. 5 illustrates the preferred embodiment vehicle locked wheel detector by schematic block diagram. As shown therein, each of the four trailer wheel hubs is provided with a ferromagnetic toothed disk or ring 24 and an associated inductive or Hall-effect ABS wheel rotation sensor 25. As visible in prior art FIG. 1, which shows the underside of a typical 18-wheel tractor-trailer combination 10, the semi-trailer 12 has four pairs of wheels near the rear of the trailer distal to tractor 11. These are identified as right side wheels 13, and left side wheels 14, with the right and left designating which side of a forward-facing truck driver they will be on. While all four pairs of wheels are typically located near the rear of the trailer distal to tractor 11, these pairs will be distinguished herein as the "right-front wheel," "right-rear wheel," "left-front wheel," and "left-rear wheel." As may be apparent, the "front" and "rear" designations are merely relative to one another, and not relative to the trailer itself. Said another way, the right-front wheel is in front of the right-rear wheel along the right side of the trailer, but may otherwise be located anywhere fore or aft along semi-trailer 12.

Returning to FIG. 5, the right-front wheel ABS wheel sensor includes a ferromagnetic toothed disk or ring 24a, an inductive or Hall-effect ABS wheel rotation sensor 25a, a waveform shaper circuit 36a, and a counter circuit 37a. The output of counter circuit 37a is then used as one input into microcomputer 38. Similar circuitry exists for each of the right-rear wheel designated with a "b" suffix, left-front wheel designated with a "c" suffix, and left-rear wheel designated with a "d" suffix. The output from counters 37a-d is accumulated within microcomputer 38 for a predetermined time interval, and then the totals for each wheel are compared with the other wheels.

When a wheel clearly has a rotational speed slower than the other wheels or decelerates faster than the vehicle could, which occurs if one wheel is sliding or slipping on the roadway surface, microcomputer 38 will then provide a control signal that will modulate and thereby reduce or remove the brake pressure to the slipping wheel. This in turn will normally result in a wheel speed increase as the wheel stops the skid and re-engages with the pavement, thereby reducing the chance of the wheel sliding or skidding on the roadway. In many systems, the brake pressure will be pulsed as required to keep the braking at a maximum while still avoiding wheel sliding. Commonly, an indicator 39 will provide visual or auditory notice to the driver that the ABS has engaged. Each of these components described in this paragraph are known in the art of ABS systems as incorporated by the patents herein above, and are presented as but one example of enablement. Nevertheless, the present invention will be readily designed by one of reasonable skill in the field, upon review of the present disclosure, to work with other types and configurations of ABS apparatus and systems. Such alternative ABS apparatus and systems are understood to be incorporated herein in alternative embodiments of the present invention.

In preferred embodiment vehicle locked wheel detector 200, a spring brake air pressure switch 210 is provided that is used to detect either the presence or absence of sufficient pressure to release the spring brakes that are found on virtually all semi-trailers 120 in use today. While spring brake air pressure switch 210 could be an analog switch, as illustrated at least the output from this switch is a digital output indicative of the pressure being sufficient to release the spring brakes. In different embodiments this is accomplished using a pressure switch triggered to switch at a predetermined pressure, whether that pressure is permanently fixed or alternatively adjustable at the factory or by an installer or serviceperson. In other embodiments, a pressure sensor provides a measure of the absolute or relative pressure, which is then subsequently processed to determine whether the pressure is sufficient to release the spring brakes. Once the determination is made, an output from spring brake air pressure switch 210 is preferably digital, indicative of the pressure being sufficient to release the spring brakes.

While an air pressure switch is preferred, since nearly all semi-trailers 12 use air to release the spring brakes, this is described for exemplary and non-limiting purpose. In some alternative embodiments fluids, electrical energy, or another alternative energy source is used to release brakes. Furthermore, in some alternative embodiments the brakes will comprise other brakes besides springs. In such embodiments, the pressure switch will not be measuring air pressure but instead the alternative energy source that is being used to activate the brakes, or in yet further alternative embodiments the pressure switch will instead comprise an apparatus that either directly or by other indirect means detects whether brakes are applied.

The output from spring brake air pressure switch 210 or equivalent is then preferably provided as an input to single-shot relay 212. Single-shot relays are also sometimes referred to as one-shot timers, interval-on-operate switches, single-shot-on-make relays, and by other names. This single-shot relay 212 will energize the output when the input receives an initiating pulse or voltage. The output from single-shot relay 212 will remain energized, whether the input initiating pulse or voltage is sustained or not, but only for a predetermined or programmable time interval. As may be appreciated then, when a driver prepares to move semi-tractor 110 and semi-trailer 120, the driver will first release the spring brakes or equivalent. Spring brake air pressure switch 210 will detect this release, and single-shot relay 212 will provide a predetermined time interval within which to detect a locked wheel. Microcomputer 38 will use this input from single-shot relay 212 to check the inputs from counter circuits 37a-d. If some of these counter circuits are active, indicating wheel movement, but one or more are not, then microcomputer 38 will most preferably trigger locked wheel indicator 230 to generate an indication of a locked wheel. As aforementioned with reference to FIG. 4, locked wheel indicator 230 may take many forms, including but not limited to auditory and visual indicators.

The output from spring brake air pressure switch 210 or equivalent will in some alternative embodiments be used as a direct input into microcomputer 38. In such alternative embodiments, microcomputer 38 will receive the output from spring brake air pressure switch 210 that provides indication that the spring brakes have been released. Once this output is received, microcomputer 38 will then monitor the outputs from counters 37a-d. When at least one of these outputs becomes active, indicating rotation of at least one wheel hub, then microcomputer 38 can presume semi-trailer 120 is in motion. At such time, microcomputer 38 will begin to compare the outputs 37a-d as described herein above to determine whether one or more of the wheel hubs are locked. Without single-shot relay 212, microcomputer 38 will serve as the timer, discontinuing checking for a locked wheel in some predetermined time interval after the first detection of semi-trailer 120 movement. In an exemplary embodiment, this time interval can be very short, on the order of a few seconds, since a tire can be destroyed in as little as ten or twenty feet of travel.

Since the preferred embodiment vehicle locked wheel detector 200 only activates when the semi-trailer 120 spring brakes are released, and then for only a very short time interval determined by either one or both of microcomputer 38 and single-shot relay 212, locked wheels will only be detected upon initial movement of the trailer from a parked status. Consequently, in preferred embodiment vehicle and locked wheel detector combination 100, ordinary braking and stopping of the vehicle such as a stoplight will not activate an indication of a locked wheel. Instead, except for the initial short time window after the trailer starts moving, any lack of output from an ABS wheel rotation sensor 25a-d will be handled in the manner of the prior art, which typically results in the generation of a failed ABS wheel rotation sensor indication.

In the preferred embodiment vehicle locked wheel detector 200, the speed sensors from all wheels are also compared by a processor to determine if a tight corner is being taken when the trailer is starting moving, and then continue checking again after the corner is finished. If both wheel hubs on one side of the trailer are either stationary or rotating below a threshold speed and the wheel hubs on the opposite side are rotating relatively more quickly, then the trailer is presumed to be pivoting around a sharp turn, and so the wheels will not be presumed to be locked. In alternative embodiments, when at least one wheel is rotating and at least one wheel is not, then the indicator light 230 or other suitable indicia will always be triggered.

In the preferred embodiment vehicle locked wheel detector 200, when an ABS wheel rotation sensor is determined to be faulty through other means, such as in normal ABS system operation, this will most preferably be stored in non-volatile memory. In such embodiments, microcomputer 38 will check to see if an ABS wheel rotation sensor has already been determined to be faulty, and if so, lack of rotation-indicating output from the faulty sensor will not trigger a locked wheel warning at the start of vehicle movement. This is preferred, since other ABS wheel rotation sensors can then still trigger a locked wheel warning if so detected. Otherwise, at each start-up there will always be at least one locked wheel detection due to the faulty sensor, and the driver will most likely ignore the locked wheel indication, even if it is applicable to another wheel. Nevertheless, in some alternative embodiments the faulty sensor will trigger a locked wheel warning at the start of vehicle movement. In such embodiments, it is highly desirable that a part of the indication of one or more locked wheels includes an indicator that shows which wheels are locked so that the driver can determine whether the warning only applies to the faulty sensor or instead applies to another wheel.

Figure 6:
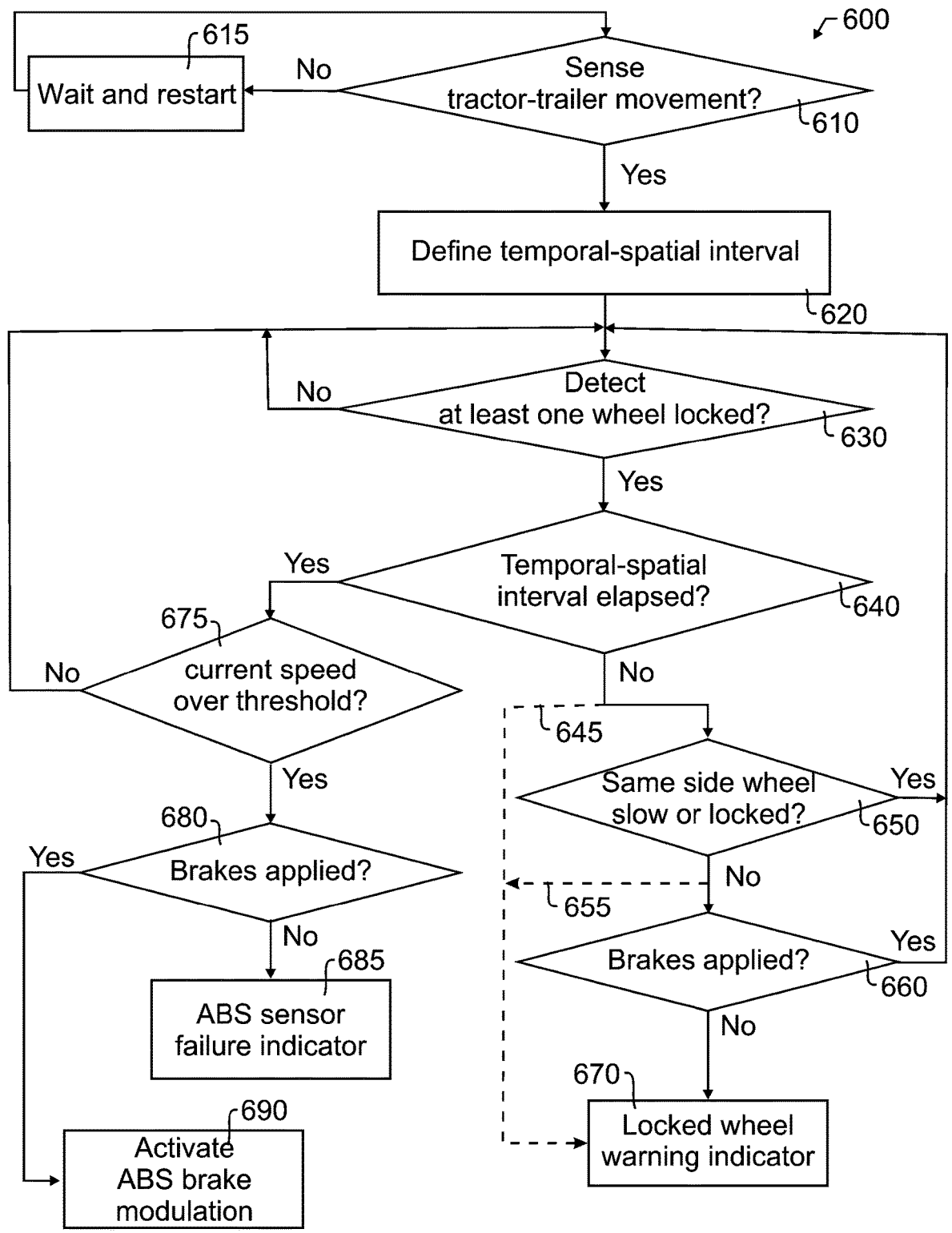
FIG. 6 illustrates a preferred embodiment method for detecting a locked vehicle wheel by simplified flowchart.

A preferred embodiment method of detecting a locked vehicle wheel 600 is illustrated in FIG. 6, wherein there are multiple preconditions for determining if an alert should be generated, and, if so, of what type. As will become apparent to those skilled in the art, preferred embodiment method of detecting a locked vehicle wheel 600 differs in a few aspects from the descriptions of preferred embodiment vehicle locked wheel detector 200.

The first precondition for determining if a locked wheel alert should be generated is sensing tractor-trailer movement at step 610. Without the trailer moving, there is no reason to try to detect a locked wheel. While in preferred embodiment vehicle locked wheel detector 200 this is preferably accomplished by first detecting a release of the trailer spring brake, in accord with preferred embodiment method of detecting a locked vehicle wheel 600 this may be detected by other sensors that detect either tractor or trailer motion. In some embodiments data will be taken from additional sensors such as a tractor speedometer. In other embodiments, sensors are added to the trailer for exemplary and non-limiting purposes including an optical speed sensor that detects the ground speed by the rear tires to compare against the ABS wheel rotation sensor 25*a-d* detecting wheel rotation speed. In other alternative embodiments, an accelerometer, a GPS system, Loran, other location or movement determination system, or other suitable apparatus will be used to detect trailer movement. If no movement of the trailer is detected, then in accord with the preferred embodiment method of detecting a locked vehicle wheel 600, the method will switch to step 615, which is a wait and restart step. This cycle of step 610 to step 615 will repeat until trailer movement is either literally or impliedly sensed.

Once movement of the tractor is sensed at step 610, then a temporal-spatial interval is defined at step 620. The issue that arises with a locked trailer wheel is the destruction of the trailer tire within a very short distance, which will occur in a very short time even at relatively low speeds. Consequently, either or both of travel distance which represents the spatial component and time which represents the temporal component can be used to delineate an initial interval within which the ABS will not be activated in the preferred embodiment and within which vehicle wheel lock can be detected.

If a trailer is present 620, then wheel rotation of the trailer needs to be detected at step 630. Once the trailer wheels are detected as moving at step 630, then at step 640 movement of the wheels will be compared to determine whether some of the trailer wheels are moving at dissimilar speeds. The determination of dissimilar speeds will preferably be accomplished by the inclusion of a certain amount of tolerance for minor or inconsequential differences between wheel rotation speeds.

However, when the speed differences exceed a threshold amount, then this will result in a determination that the trailer wheels are moving at dissimilar speeds.

If the trailer wheels are rotating at the same speed, then there is no concern for a locked wheel, and the system will preferably stay in the wait mode 690 until the tractor is stopped and subsequently restarted. However, if there is dissimilar wheel rotation detected at step 640 then in some embodiments as illustrated by dashed line 645 this will trigger the locked wheel indicia at step 670. However, in other embodiments, one or more additional checks are made. As illustrated, to determine the kind of warning indicia required, the wheels on the same side of the trailer are compared to each other at step 650 to see if they are rotating at a similar speed. If so, then it is likely that the speed differential is due to a very sharp corner, something which should be avoided, but not necessarily a locked wheel. In this case, a wheel speed warning light 680 will in some embodiments be triggered. As may be appreciated, this can occur simply due to a tight turn, and the driver will immediately know that nothing is amiss. However, if there is not a tight turn, the driver will desirably be urged by the warning light to check for other problems.

If instead it is determined at step 650 that only a single wheel is turning too slowly, then in some embodiments as illustrated by dashed line 655 this will trigger the locked wheel indicia at step 670. However, in other embodiments, the speed of the trailer is next checked to see if the trailer is traveling above or below a speed threshold at step 660. If the speed is below a speed threshold, then it is determined that a wheel is locked and a full locked wheel warning 670 will be initiated that may for exemplary and non-limiting purpose include both a warning light such as indicator light 230 and an alert tone. When the speed is above the threshold at step 660, then either the ABS wheel rotation sensor is failing or at least one tire will almost instantaneously be destroyed. In either case, triggering a locked wheel alarm at step 670 isn't merited. Instead, and optionally, wheel speed warning light will be triggered.

While the preferred and alternative embodiments depict or describe a warning light, some alternative embodiments may exclude the warning light and rely upon other indicators.

As the preferred embodiment method of detecting a locked vehicle wheel 600 illustrates when compared to the description of preferred embodiment vehicle locked wheel detector 200, various alternative sources of information may be used to detect a state or condition of a semi-trailer 120. While the preferred embodiment vehicle locked wheel detector 200 only uses sensor data from ABS wheel rotation sensors and spring brake air pressure switch 210, for exemplary and non-limiting purpose various alternative embodiments will also include sensors that detect brake pedal pressing, steering wheel rotation, speedometer data, and other relevant data.

Again for exemplary and non-limiting purpose, steering wheel rotation will be used in some alternative embodiments to avoid triggering a locked wheel detection when the steering wheel is rotated sufficiently to cause one or both wheels on one side of the trailer to pivot about a vertical axis or scrub sideways along the pavement rather than to roll about the axle.

In another alternative embodiment, vehicle locked wheel detection is only preformed during a limited time interval after initial motion, and thereafter the system is disabled.

In yet another alternative embodiment, not only are a warning light and audible alarm triggered, a haptic feedback in the steering column provides additional warning stimulation, which may be effective warning means for individuals who are hard of hearing, or if loud noises (i.e., music, podcasts, road noise, etc.) are present in the tractor cabin.

The preferred and alternative embodiments as described herein above are directed primarily to typical 18-wheel tractor-trailer combinations. Nevertheless, those reasonably skilled in the art will, upon reading the present disclosure, recognize that the features and teachings disclosed herein will be applicable to other vehicles that will benefit from the addition of the vehicle locked wheel detector as disclosed herein in the various preferred and alternative embodiments.

Consequently, while a typical 18-wheel tractor-trailer in combination with a vehicle locked wheel detector as disclosed herein is most preferred, the invention is not solely limited thereto.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a semi-tractor, a semi-trailer, and a vehicle locked wheel detector, said semi-tractor comprising:
 a motive power plant;
 a trailer coupler; and
 a source of compressed air;
said semi-trailer comprising:
 a tractor coupler configured to mate with said trailer coupler and allow said semi-trailer to articulate behind said semi-tractor while being towed thereby;
 an air line selectively coupled to said source of compressed air and configured to receive compressed air therefrom;
 a cargo container configured to carry cargo;
 a first tire offset to a first side of said semi-trailer;
 a first anti-lock brake system wheel rotation sensor configured to detect an angular rotation velocity of said first tire;
 a second tire offset to a second side of said semi-trailer distal to said first tire;
 a second anti-lock brake system wheel rotation sensor configured to detect an angular rotation velocity of said second tire; and
 a spring brake selectively released by said compressed air delivered by said air line;
said vehicle locked wheel detector comprising:
 a spring brake air pressure switch configured to detect a pressure within said air line sufficient to release said spring brake;
 a locked wheel indicator; and
 a microcomputer configured to detect a lack of rotation from said first tire angular rotation velocity sensor in combination with said spring brake air pressure switch detecting said pressure in said air line sufficient to release said spring brake, and configured to initiate said locked wheel indicator responsive thereto.

2. The combination semi-tractor, semi-trailer, and vehicle locked wheel detector of claim 1, wherein said vehicle locked wheel detector further comprises a single-shot relay coupled between said spring brake air pressure switch and said microcomputer, said single-shot relay configured to initiate a time interval responsive to said spring brake air pressure switch detecting said pressure in said air line sufficient to release said spring brake, said time interval within which said microcomputer can initiate said locked wheel indicator.

3. The combination semi-tractor, semi-trailer, and vehicle locked wheel detector of claim 2, further comprising:
 a brake application detector; and
 an anti-lock brake system sensor failure indicator,
wherein said microcomputer is configured to initiate said anti-lock brake system sensor failure indicator responsive to said lack of rotation from said first tire angular rotation velocity sensor in combination with said spring brake air pressure switch detecting said pressure in said air line sufficient to release said spring brake and in further combination with said brake application detector detecting no application of a braking system and in further combination with an expiration of said time interval.

4. The combination semi-tractor, semi-trailer, and vehicle locked wheel detector of claim 1, wherein said semi-trailer further comprises:
 a third tire offset to said first side of said semi-trailer;
 a third anti-lock brake system wheel rotation sensor configured to detect an angular rotation velocity of said third tire;
 a fourth tire offset to said second side of said semi-trailer;
 a fourth anti-lock brake system wheel rotation sensor configured to detect an angular rotation velocity of said fourth tire;
wherein said microcomputer is configured to compare said first tire an angular rotation velocity to said third tire an angular rotation velocity subsequent to said detection of a lack of rotation from said first tire angular rotation velocity sensor, and is configured to initiate said locked wheel indicator responsive to said first to third tire comparison indicating an angular rotation velocity deviation between said first tire angular rotation velocity and said third tire angular rotation velocity that exceeds a threshold.

5. A vehicle locked wheel detector, comprising
- a vehicle movement sensor;
- a first anti-lock brake system wheel rotation sensor configured to detect an angular rotation velocity of a first tire;
- a locked wheel indicator; and
- a microcomputer configured to detect a lack of rotation from said first tire angular rotation velocity sensor responsive to said vehicle movement sensor sensing vehicle movement, and configured to initiate said locked wheel indicator responsive to said detection of a lack of rotation from said first tire angular rotation velocity sensor.

6. The vehicle locked wheel detector of claim 5, wherein said vehicle movement sensor further comprises a brake application detector.

7. The vehicle locked wheel detector of claim 6, wherein said brake application detector further comprises an electrical braking signal.

8. The vehicle locked wheel detector of claim 6, wherein said brake application detector further comprises a fluid pressure switch.

9. The vehicle locked wheel detector of claim 5, wherein said vehicle movement sensor further comprises a spring brake air pressure switch configured to detect a pressure within said air line sufficient to release said spring brake.

10. A method for alerting a semi-tractor-trailer driver to adverse wheel rotation conditions, comprising the steps of:
- sensing movement of a semi-trailer;
- defining a temporal-spatial interval responsive to said sensing step;
- detecting a lack of rotation of at least one semi-trailer wheel using a first antilock brake system wheel speed sensor while said semi-trailer movement is being sensed;
- determining whether said temporal-spatial interval has elapsed responsive to said detecting step; and
- indicating a locked wheel to said semi-tractor-trailer driver responsive to said detecting a lack of rotation of said at least one semi-trailer wheel within said temporal-spatial interval.

11. The method for alerting a semi-tractor-trailer driver to adverse wheel rotation conditions of claim 10, further comprising the steps of:
- resolving whether a current speed of movement of said semi-trailer is over a threshold speed;
- ascertaining whether a trailer brake has been applied; and
- indicating a failure of at least one of said first and second anti-lock brake system wheel speed sensors to said semi-tractor-trailer driver responsive to simultaneously and subsequently to said temporal-spatial interval detecting said lack of rotation of at least one semi-trailer wheel, resolving that said current speed is over said threshold speed, and ascertaining that a trailer brake has not been applied.

12. The method for alerting a semi-tractor-trailer driver to adverse wheel rotation conditions of claim 11, further comprising the step of:
- activating an antilock brake system brake modulator responsive to simultaneously and subsequently to said temporal-spatial interval detecting said lack of rotation of at least one semi-trailer wheel, resolving that said current speed is over said threshold speed, and ascertaining that a trailer brake has been applied.

13. The method for alerting a semi-tractor-trailer driver to adverse wheel rotation conditions of claim 10, further comprising the steps of;
- ascertaining a rotation speed of a second semi-trailer wheel using a second antilock brake system wheel speed sensor; and
- determining whether a difference between said second semi-trailer wheel rotation speed and said semi-trailer movement exceeds a threshold indicative of an locked semi-trailer wheel; and
- not indicating a locked wheel to said semi-tractor-trailer driver responsive thereto.

\* \* \* \* \*